Patented Nov. 20, 1928.

1,692,126

UNITED STATES PATENT OFFICE.

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE.

CATALYTIC OXIDATION OF NAPHTHALENE.

No Drawing. Original application filed November 24, 1926, Serial No. 150,623. Divided and this application filed December 12, 1927. Serial No. 239,617.

The present invention relates to the processes for the catalytic oxidation of naphthalene in the vapor phase to intermediate products, such as phthalic anhydride, etc.

In the past naphthalene has been oxidized in the vapor phase to phthalic anhydride, sometimes with the concurrent production of alphanaphthaquinone and maleic acid, by passing vapors of naphthalene over catalysts containing metals of the fifth and sixth groups of the periodic system, such as vanadic oxide, molybdenum oxide, and the like. These processes used hitherto have had considerable success but are open to the very serious disadvantage that it is practically impossible to so control the reaction as to obtain high percentage yields with commercially feasible outputs. The oxidation of naphthalene to alphanaphthaquinone presents great difficulty because of the relative instability of this product and has not hitherto been successfully carried out with oxide catalysts. The oxidation to phthalic anhydride has had more success as the product is more stable but in this case also the reaction tends to go too far, producing considerable amounts of total combustion as well as smaller amounts of maleic acid. When the reaction goes too far the amount of heat evolved is enormously increased which very seriously affects the control of the reaction and necessitates the use of very powerful cooling means, such as boiling metal baths and the like. If the catalyst is sufficiently diluted or the reaction sufficiently damped to prevent large amounts of total combustion, serious trouble arises due to the fact that part of the naphthalene will not oxidize.

Even when the average temperature of the contact mass is controlled, there is a serious tendency of the catalyst hitherto used to form zones of local over-heating due to the excessive activity of the catlysts and perfectly homogeneous dilution has not been feasible hitherto.

The present invention overcomes partly or wholly most of the disadvantages set out above and consists broadly in the oxidation of organic compounds, especially in the vapor phase, in the presence of catalysts or contact masses in which part or all of the catalytically active elements are present in the form of two component zeolites, that is to say, base exchanging polysilicates which are formed by methods analogous to those of the natural or artificial water-softening zeolites which are usually either aluminum double silicates or aluminosilicates. Among the natural zeolites are nepheline, leucite, feldspars, and the like, and numerous artificial aluminum zeolites have been prepared for water-softening means. In general, two component zeolites are prepared by the reaction of two classes of components, i. e. silicates and either metallates or metal salts. The reaction may be in solution or in the molten state. Throughout the present application, the word "zeolite" will be strictly limited to base exchanging polysilicates which are prepared or result as the reaction products of two classes of reacting components, at least one of which is a silicate, together with their derivatives.

The zeolite catalysts of the present invention are characterized by a highly porous, honeycomb like structure and show high resistance to melting, recrystallization and poisoning. The zeolites may be used either diluted or undiluted, but for best results in the catalytic oxidation of naphthalene I prefer to use diluted zeolites in which the diluent bodies are preferably homogeneously mixed with the zeolite components. The invention, of course, is not limited to the use of these diluted zeolite catalysts which constitute the preferred embodiment thereof and undiluted zeolites may be used or they may be mixed mechanically with diluents or impregnated into porous diluents.

The catalytic elements may be present in zeolites in four different forms, namely in the zeolite nucleus, that is to say, in non-exchangeable form, as one of the exchangeable cations of the zeolite, as an anion which may form with the zeolite a salt-like body, and finally in the case of diluted zeolites in the diluent, which may either be itself a catalyst or may be impregnated with catalytic components. Obviously, of course, catalytic elements may be present in more than one of these forms in a single catalyst and a large number of such combinations are possible.

In addition to the elements which are actual catalysts, certain other elements, while not themselves catalysts, or at least not strong catalysts, appear to exert a marked effect on the catalytic components themselves and may be termed activators. The $SiO_2$ group notably appears to possess marked activating powers and it is one of the advantages of the present invention that the same zeolite structure or framework which permits the fine or molecular distribution of catalytic atoms or groups in a highly porous, physically homogeneous product, also supplies the activating $SiO_2$ group.

It is an advantage of the zeolites of the present invention that by suitable treatment with acid gases the exchangeable alkali of the zeolites may be transferred into non-alkaline compounds which tend to stabilize the oxidation of naphthalene and which are formed in intimate homogeneous association with the catalytically active components. Stabilizers may also be added to zeolites in a pre-formed state. I do not claim in this invention the use of such stabilizers generally, this forming the subject of my co-pending application No. 196,393, filed June 3, 1927. In the present application, however, all such stabilizing means mixed with or formed on zeolite catalysts are included as specific features of the present invention.

It is an advantage of the present invention that an enormous number of different catalysts can be prepared, all sharing the extremely advantageous physical structure of the zeolites and being provided with suitable silicious activating components. The chemical combination of the zeolite molecule is not accurately known because it is impossible to obtain the molecular weight of the product without disintegrating it. Without limiting the present application to any theories of zeolite constitution, I am of the opinion that the zeolite molecules existing in actual products are of extremely high molecular weight because I have found that catalytic components can be introduced and chemically combined in the zeolite nucleus in substantially any desired proportions. This indicates that the molecule is not of low weight, as otherwise, the law of molecular proportions would at once become apparent. It is, of course, possible that the zeolites are not of high molecular weight, but consist of a solid solution of different simple zeolites. The underlying chemical reasons are, however, not important, the main thing being that it is possible to introduce catalytic components in almost any desired proportions into the zeolite molecule in non-exchangeable form so that it is possible to prepare catalysts having just the right proportions of one or more catalytic components for any particular reaction, a feature which is of enormous value to the catalytic chemist.

The nucleus or non-exchangeable portion of the zeolite molecule is ordinarily considered to consist of metal oxides, usually amphoteric metal oxides, combined with $SiO_2$ to form an anion which appears to behave as a single group and cannot be split by ordinary chemical means without destroying the zeolite. A large number of catalytically active metal oxides may be introduced into this portion of the zeolite nucleus either in the form of their metallates or in the form of neutral or acid salts or complex compounds. In some cases, it may be necessary to introduce the desired metal in a stage of oxidation different from that which it is to finally possess in the finished zeolite and effect suitable oxidation or reduction during zeolite formation. The following elements in suitable stages of oxidation in which they possess the desired amphoteric properties may be included in the metal oxide portion of the zeolite: copper, silver, gold, bismuth, beryllium, zinc, cadmium, boron, aluminum, rare earths, titanium, zirconium, tin, lead, thorium, niobium, antimony, tantalum, chromium, molybdenum, tellurium, tungsten, uranium, vanadium, manganese, iron, nickel, cobalt, osmium, arsenic. They may be introduced singly or in mixture in any desired proportion and may be in the form of simple or complex ions.

When naphthalene is oxidized beyond the stage of alphanaphthaquinone, it is generally assumed that the reaction takes place in stages and it may be desirable to incorporate different catalysts into the same zeolite, one catalyst favoring one stage and one another, and it is an advantage of the present invention that it is possible to incorporate several different kinds of catalysts into the same zeolite, thereby effecting an extraordinarily homogeneous mixture due to the molecular dispersion of the different catalyst components throughout the zeolite mass. In some cases it may be necessary to carry out a plurality of different types of reactions, thus, for example, naphthalene may be oxidized to phthalic anhydride and carbon dioxide split off to produce benzoic acid. The reaction, which may be carried out in two stages using zeolite catalysts in one or both, may also be carried out in a single stage in which a combination catalyst may be used and it is an advantage of the present invention that such a combination catalyst can be prepared as a physical, and in many cases chemically homogeneous product.

I have found that the oxidation of naphthalene, particularly to phthalic anhydride, is most effectively carried out in the presence of zeolite catalysts which contain vanadium chemically combined in non-exchangeable form as a metal oxide component of their nucleus and this may be considered the preferred type of catalyst for producing phthalic anhydride.

For the production of lower stages of alphanaphthaquinone it is sometimes advantageous to eliminate the vanadium or to eliminate almost all of it in order to prevent too vigorous an oxidizing effect which might destroy the relatively unstable alphanaphthaquinone and such zeolite catalysts, which may contain little or no vanadium in the nucleus, are included in the present invention.

The vanadium which is present in the nucleus may be in the form of trivalent, tetravalent or pentavalent vanadium, and for some catalysts it is very desirable to introduce into the nucleus part of the vanadium in one state of oxidation and part in another. A similar possibility exists with respect to other metal elements which are capable of introduction in different stages of oxidation and particularly with elements of the fifth and sixth groups, such as: niobium, antimony, tantalum, chromium, molybdenum, tungsten, bismuth and uranium.

The $SiO_2$ portion of the zeolite nucleus does not necessarily have to consist solely of $SiO_2$, although for many catalysts the activating or stabilizing effect of the $SiO_2$ radical makes this desirable. In other cases, it may be desirable that part of $SiO_2$ should be substituted by a suitable acidic oxide which is capable of zeolite formation and in this way components of catalytic, activating or stabilizing effect can be introduced, such as, for example, one or more of the acidic oxides of: phosphorus, sulfur, tin, titanium, tungsten, chromium, niobium, tantalum, uranium, molybdenum, arsenic, antimony, vanadium, etc. The present invention, however, does not include processes of oxidation in which a base exchange catalyst is used which does not contain $SiO_2$. Such catalysts do not come under the definition of the word "zeolite" as used in the present invention, and form the subject-matter of the co-pending application, Serial No. 171,727 filed February 28, 1927.

Additional catalytic, activating or stabilizing components can be introduced by base exchange. Examples of such components are the simple or complex ions of: lithium, sodium, potassium, ammonium, copper, rubidium, caesium, silver, gold, beryllium, magnesium, calcium, zinc, strontium, cadmium, barium, mercury, aluminum, thallium, titanium, zirconium, tin, antimony, thorium, vanadium, bismuth, chromium, uranium, manganese, cobalt, iron, palladium, platinum.

After the zeolite is formed, it may then be caused to react with compounds having suitable anions which form with the zeolite bodies which behave in many ways as if they were salts. It is not known whether actual salts are formed, since, of course, the products are for the most part not soluble in water, and the invention is, therefore, not limited to any particular chemical theory of combination. Among the anions which can be caused to react with the zeolites under suitable conditions to form salt-like bodies are the acidic oxides of the following elements: vanadium, tungsten, uranium, chromium, molybdenum, manganese, tantalum, niobium, antimony, selenium, tellurium, arsenic, phosphorus, bismuth, sulfur, chlorine, platinum, and boron. These elements may be introduced in the form of simple or complex anions, such as for example, ferro and ferricyanogen, sulfocyanogen, metal cyanogen, and ammonia complexes may also be caused to react with the zeolites. A single anion or a plurality of anions can be caused to react either simultaneously or successively.

It will thus be apparent that there are four groups within the zeolite body, the non-exchangeable nucleus with its metal oxide and acidic oxide components, the exchangeable cations and the anions which form with the zeolite salt-like bodies. The effect of a particular catalytic element is not necessarily the same when it is present in the nucleus as when it is present, for example, as an exchangeable cation, and it is thus possible to form innumerable combinations which permit the catalytic chemist to produce catalysts having characteristics exactly adjusted for the particular oxidation which he desires to carry out.

In all cases, the catalytic components are distributed throughout the zeolite molecule in a state of molecular subdivision and apparently are protected to a large extent by the surrounding zeolite skeleton or framework so that they are far less subject to poisoning and to other deleterious influences. The products are also for the most part highly resistant to the temperatures which obtain in the catalytic oxidations in question, and the highly porous, honeycomb-like structure of the zeolite operates to greatly enhance the catalytic activity of the catalytic components.

As has been pointed out above, it is usually not desirable to use diluted zeolites as catalysts in the oxidation of naphthalene because, unless the proportion of catalytic component is very small, the catalysts are too strong and tend to evolve excessive amounts of heat since most of the reactions are highly exothermic. While in certain cases, therefore, it is possible to use undiluted zeolite catalysts in organic oxidations, and the present invention includes such use, I prefer, for the most part, to use diluted zeolites, which, in general, are of more satisfactory catalytic activity and which also usually are cheaper to produce, as, in general, the diluent bodies used are less costly than the zeolite components themselves.

Almost any inert or activating body can be used as a diluent. Preferably, however, I use porous diluents and particularly diluents which are rich in silica in order to enjoy the valuable stabilizing and activating properties of the $SiO_2$ group, which has been mentioned in connection with the zeolite structure itself. The use of diluents rich in silica is particularly important. A few of the many possible diluents are the following: kieselguhrs of all kinds, particularly natural or treated "Celite" earths, silicious powders of all kinds, powdered zeolites, either natural or artificial, powders of rock, stones, tuffs, trass, lava and similar volcanic products which are frequently highly porous, green sand, glauconite, pulverized slag wool, cements, sand, silica gel, pulverized earthen ware, fuller's earth, talc, glass powder, pumice meal, asbestos, graphite, quartz meal and powders of various minerals rich in quartz, metal powders, metal oxides and salts, particularly tungstates, vanadates, chromates, uranates, manganates, cerates, molybdates, etc. Some of these diluents are inert, others contain silica and may be considered as activators, and still others are themselves catalytically active. It should be noted that when an inert body is sufficiently finely divided, as, for example, when the average particle size is less than 60 microns, the diluent possesses surface energy which increases the absorption and diffusion speed and porosity of the final product and, therefore, may be considered as a kind of physical catalyst or activator.

The diluents may be incorporated in many ways. For example, they can be mixed with one or more of the zeolites before formation. The zeolite gel immediately after formation may be mixed with diluents or a combination of these processes can be carried out. Zeolite components or the finished gel may be impregnated into diluents, usually porous diluents and the like. When the diluent is mixed with components or gel before hardening and in some cases, where the zeolite components are impregnated into the diluent in considerable amount, the resulting product is a physically homogeneous whole, in which the diluent particles are uniformly distributed throughout the zeolite framework, and for many purposes this type of product is the most satisfactory, although the invention is in no sense limited thereto. It should be understood that diluent bodies may be impregnated with various catalytic components before incorporation in the zeolite and many highly active catalysts can be produced in this way. The impregnation may be by precipitation, reduction, oxidation or by the introduction of colloidal suspensions, or solutions of the catalytic component. In some cases, catalytic components may also be caused to react with the diluent or to form therewith chemical compounds, although this is not as common, since most of the diluents are relatively inert chemically.

Many possible types of diluted zeolites and processes are fully described in a large number of examples in the application of Jaeger & Bertsch, Serial No. 95,771, filed March 18, 1926, and any of the processes and products therein described may be used to produce catalysts of the present invention.

Instead of incorporating catalytic components chemically combined with the zeolite, a non-catalytic zeolite may be used as a carrier or diluent for catalytic components impregnated into the fine pores of a natural or artificial zeolite. In such a case, the zeolite acts as an activator by reason of its physical structure and its high content of silica. Instead of impregnating catalytic components into a finished zeolite, it is also possible to incorporate insoluble catalytic bodies with the components of the zeolite during formation so that the catalytic particles are uniformly and homogeneously distributed throughout the zeolite structure, but are, of course, in most cases, not in a state of molecular division as in the case of catalytic components chemically combined with the zeolite. Another important class of catalysts is produced by impregnating inert or activating diluent bodies with catalytic components and then incorporating these impregnated diluents with a zeolite which is not itself catalytically active. In all cases, the advantages of the zeolite structure are obtained and the particular catalyst to be used in any given reaction will be determined by the conditions of that reaction.

In some cases, the homogeneous diluted zeolite may advantageously be in the form of a film or coating on massive carrier granules or fragments and such contact masses are included in the present invention. The massive carriers may be inert, activating or themselves catalytic, as, for example, when certain catalytic metal alloys are used. Certain contact masses using metal fragments as massive carriers are also of importance in some exothermic reactions as they tend to improve the heat conductivity of the catalyst layer and prevent the formation of local hot spots which are so series in naphthalene oxidations.

The remarkable effectiveness of the zeolite catalysts of the present invention for the oxidation of naphthalene is probably due to a number of features such as the advantageous porous, physical structure of the catalysts, their high resistance to the temperatures which obtain in the reactions, the activating power of the silica present, etc. Without limiting the invention to any theories, however, I am of the opinion that one of the most important reasons for the effectiveness of the catalysts lies in the fact that the zeolite framework separates the individual catalyst particles or catalyst molecules from each other so that at no point in the catalyst is there a large amount of active catalytic material present. There is, therefore, not such a tendency to the formation of local hot spots due to too violent reaction. I have found that in naphthalene oxidations, the intermediate products are more or less unstable, particularly in the presence of the catalysts which cause their formation, and at elevated temperatures. I am, therefore, of the opinion that the far reaching isolation, and, to a certain extent, insulation of one catalyst particle or molecule from the other prevents the decomposition of the intermediate products formed because they are almost immediately brought out of contact with the catalyst and the heat evolved is uniformly distributed throughout the zeolite framework.

For the oxidation of naphthalene, the presence of an alkali is sometimes undesirable, especially where it is desired to obtain phthalic anhydride as the reaction product, and the alkalinity of most zeolites is preferably neutralized, and in many cases it is desirable to have the product distinctly acid. This neutralizing of alkali can be effected in several ways. In the first place, the zeolite reaction can be caused to take place in solutions which are not strongly alkaline. The resulting products have a comparatively low base exchange power and perhaps there is formed a mixture of zeolites and non-base exchanging polysilicates. The physical structure, however, is similar to that of the zeolites which possess strong base exchanging powers, and for many purposes the catalysts are just as effective. In some reactions, this diminished alkalinity may be sufficient to permit the reaction to be carried out satisfactorily. In other cases, where even this degree of alkalinity is undesirable, the zeolite may be treated with acids to form salt-like bodies which are acid in their nature, the product, of course, varying with the amount of acid which is caused to react with the zeolite. I have found, however, that in the case of most catalysts, it is desirable to subject the product to treatment with an acid gas at temperatures of from 400–500° C., in the presence of air or other oxidizing medium. Such acid gases may be $SO_2$, $SO_3$, halogens, oxides of nitrogen, etc., and the process is described in my prior applications Serial No. 48,001, filed August 3, 1925, and Serial No. 48,002, filed Aug. 3, 1925.

This procedure in the case of most zeolite catalysts has the additional advantage that the acid gas reacts with the alkali present to form salts of the alkali forming metals, which, as has been pointed out above, act as stabilizers and tend to prevent the reaction becoming uncontrolled and proceeding to total combustion with serious losses in yield. This treatment also appears in most cases to enhance the activity of the zeolite and possibly this is due to physical changes which may take place. In general, it should be clearly understood that all zeolite catalysts undergo certain secondary chemical and perhaps physical transformations during catalysis, and therefore, the use of the word "zeolite" or "zeolite body" in the claims is not intended to limit the present invention to processes in which the zeolite identity of the catalyst remains throughout the reaction. The nature of these secondary transformations is not definitely known, and therefore, in the claims the word "zeolite" is used to cover zeolites which have undergone secondary changes during catalysis as a result of preliminary treatment with acid gases. In all cases, however, the macroscopic, and in many cases, the microscopic, physical structure of the zeolite catalyst remains unchanged.

For the most part, zeolite catalysts of the present invention are sufficiently porous, but in some cases it may be desirable to still further increase this porosity. In such cases, soluble, volatile or combustible fillers, may be incorporated into the zeolite and later on removed, leaving corresponding hollow spaces and still further increasing the porosity of the product.

In most cases, the zeolite catalysts are of sufficient mechanical strength to withstand all the ordinary strains to which they are subjected during catalysis. In some cases, however, particularly where the zeolite is diluted with a very large amount of diluents, the mechanical strength may be insufficient for catalytic purposes. In such cases, the product may be washed with waterglass, particularly dilute solutions of waterglass and a certain amount of surface silicification is thereby effected. At the same time, this treatment may be used to neutralize or change the degree of alkalinity of the product.

In the following specific examples a number of representative zeolite catalysts are described, but the invention is, of course, not limited to the catalysts specifically enumerated, nor to the methods of formation of the catalysts therein described, although an attempt has been made to illustrate as many as possible of the representative methods. In general, however, any suitable processes for the formation of the zeolites may be used, such as for example in the processes described in the co-pending applications of Jaeger & Bertsch, Serial No. 91,229, filed Feb. 27, 1926, Serial No. 95,771, filed Mar. 18, 1926, and Serial No. 100,116, filed Apr. 6, 1926.

*Example 1.*

An artificial carrier is prepared by mixing 100 parts of kieselguhr and 120 parts of 34° Bé. potassium waterglass solution and forming into tablets. The tablets are first treated with 18.2 parts of $V_2O_5$ either in the form of 10% potassium vanadate solution or a hot saturated ammonium vanadate solution. The impregnation is effected by spraying the solutions onto the tablets, the latter being continuously turned over and heated to a temperature sufficient to effect evaporation of the water. A little potassium silicate solution is then cautiously sprayed onto the tablets in the same manner. This solution may preferably be made by diluting a 33° Bé. solution containing about 24 parts of $SiO_2$, with 100 parts of water. If desired, the sequence may be reversed and the potassium waterglass first sprayed on followed by the vanadate solution.

By either method, a film of a vanadium zeolite is formed on the artificial carrier in a nascent state. The product is then treated with air containing carbon dioxide at a temperature below 100° C. and then with gases containing $SO_2$ at 400° C. A contact sulfuric acid process begins almost at once and the $SO_3$ formed tends to destroy the alkalinity both of the artificial carrier and of the zeolite film.

Instead of an artificial carrier, fragments of quartz, "Celite", quartz filter stones, diatomaceous stones or flints may be used.

Naphthalene vapors mixed with a large excess of air, for example, in the ratio of 1:30 by weight are passed over the catalyst at 350–420° C. and a good yield of alphanaphthaquinone is obtained.

*Example 2.*

The following mixtures are prepared:
(1) 42 parts of $SiO_2$ in the form of a 33° Bé. potassium waterglass solution are diluted with 200 parts of water and 70 parts of "Celite" are stirred in.
(2) 18.2 parts of $V_2O_5$ are dissolved in a concentrated caustic potash solution to form a 10% potassium vanadate solution.
(3) 5 parts of aluminum oxide are dissolved up in 5 N potassium hydroxide solution to form potassium aluminate.

Mixtures 1, 2 and 3 are poured together and heated to 60–70° C. 10% sulfuric acid is then permitted to run in with vigorous agitation until the whole mass solidifies to a gel which must remain alkaline to litmus. This is then sucked, well pressed and dried at temperatures below 100° C. whereupon the mass is broken into fragments and sprayed with sulfuric acid of a strength of 1 part concentrated sulfuric acid to 5 parts of water until a sample submerged in water in a test tube and warmed shows an acid reaction to congo. The product is an acid sulfuric acid salt-like body of the zeolite in which vanadium and aluminum are present in non-exchangeable form.

The catalyst is calcined with air at 300–400° C. and a mixture of naphthalene vapor and air in proportions of 1:10 to 1:15 is passed over the cataylst at 380–450° C. An almost theoretical yield of phthalic anhydride is obtained.

*Example 3.*

60 parts of "Celite" or a mixture of 40 parts "Celite" and 40 parts finely broken quartz, pumice, glass, neutral silicates or asbestos fibres are suspended in 300 parts of water. To this slurry is added a solution of potassium vanadate containing 14 parts of $V_2O_5$ dissolved in 5 N potassium hydroxide solution containing 12 parts of 100% KOH. The mixture is heated up to 60–65° C. and 2 N sulfuric acid is added with vigorous agitation precipitating finely divided $V_2O_5$ in the carrier material. The amount of 2 N sulfuric acid should be so chosen as to result in a solution which is acid to congo. The suspension is then heated for one-half an hour at 95° C. with vigorous agitation so that the $V_2O_5$ which is present in collodial solution is completely precipitated. The mixture is then sucked and the cake washed with water until the wash water is no longer acid to congo, whereupon the cake is dried and comminuted. 100 parts of potassium waterglass solution of 30 Bé. are diluted with 24–40 parts of water and kneaded into the impregnated carrier described above, the kneading being continued until the brown color of the $V_2O_5$ has disappeared. The product is then formed into fragments and constitutes a diluted zeolite, in which $V_2O_5$ is present in non-exchangeable form.

In a similar manner, a zeolite can be prepared by substituting an equivalent amount of potassium vanadite for the potassium vanadate, in which case the zeolite will contain tetravalent vanadium. A mixture of the solutions may also be used, producing a zeolite containing both tetravalent and pentavalent vanadium in non-exchangeable form.

The catalyst is then sprayed with 5–10% sulfuric or phosphoric acid to form the so-called salt-like body, which is then heated with air at 400° C.

Naphthalene vapors and air in the proportion of from 1:10 to 1:30 are passed over the catalyst at 370–450° C. and an excellent yield of phthalic anhydride of high purity is obtained.

A still better catalyst for the oxidation of naphthalene to phthalic anhydride is obtained if the zeolite is sprayed with a 3% vanadyl sulfate solution instead of sulfuric or phosphoric acid solutions. After the calcination with air at a temperature of 450° C. this catalyst will give excellent yields of phthalic anhydride under the reaction conditions described above and can be loaded to almost double the capacity of the previously described catalyst.

*Example 4.*

60 parts of "Celite" or mixture of 40 parts of "Celite" and 40 parts of finely divided quartz or other diluents as described in Example 1, are suspended in 300 parts of water. A solution of potassium vanadate or vanadite is formed by dissolving 14 parts of $V_2O_5$ or $V_2O_4$ in 5 N potassium hydroxide solution containing 12 parts of 100% KOH, and the solution is stirred into the suspension. 100 parts of potassium waterglass solution of 33° Bé. are diluted with three times the amount of water and run into the mixture, whereupon a 5-10% sulfuric or phosphoric acid solution or a mixture of the two acids is cautiously added in small portions until the zeolite precipitates out in the form of a thick gel, care being taken that the gel remains alkaline to litmus. This is then sucked and the cake dried at temperatures below 100%° C. whereupon it is broken into fragments which are then sprayed with sufficient 5-10% sulfuric acid so that a sample suspended in water gives an acid reaction to congo. Instead of spraying with dilute acid, the dried zeolite may be calcined at temperatures of 450-500° C. with oxidizing gases containing 7% of $SO_2$. The catalyst obtained by either method is excellent for oxidation of naphthalene to alphanaphthaquinone in the vapor phase, a mixture of naphthalene vapors and air in the proportion of from 1:30 to 1:45 by weight being passed over the catalyst at a temperature of 370-420° C.

The same catalyst can be rendered suitable for the oxidation of naphthalene to phthalic anhydride by washing the carefully prepared zeolite body three or four times with 200 parts of water, the further treatment with acids or acid gases being the same. This wash treatment removes excess alkali and the catalyst thus produced tends to oxidize naphthalene to phthalic anhydride. This is an excellent example of the effect of salts of alkali-forming metals as stabilizers, since, of course, the excess alkali is transformed into the corresponding salt by treatment with dilute acids or calcining with acid gases. The stabilizing or damping effect of the alkali metal salt is sufficient to change a phthalic anhydride catalyst to one which favors the next lower stage of oxidation, namely, alphanaphthaquione.

Example 5.

60 parts of "Celite" or a mixture of 40 parts of "Celite" and 40 parts of finely divided quartz or other diluents described in Example 4, are mixed with 100 parts of potassium waterglass solution of 33° Bé. diluted with three times the amount of water. 14 parts of vanadic acid are then reduced by means of $SO_2$ in a boiling aqueous suspension, acidified with sulfuric acid until the blue vanadyl sulfate solution is formed. This solution is then added to the mixture with vigorous agitation, maintaining the waterglass suspension alkaline to litmus throughout. A gel forms which is sucked in the usual manner and treated as described in the foregoing examples. If the zeolite is washed several times with 200 parts of water before drying or calcining, the catalyst then causes the oxidation of the naphthalene to phthalic anhydride when naphthalene vapors and air are passed over it under the reaction conditions described in the foregoing examples.

Similar catalysts can also be obtained by forming salt-like bodies with the zeolite or by introducing other cations by base exchange.

Example 6.

14.4 parts of molybdic oxide in the form of potassium molybdate are dissolved in 400 parts of water, into which solution 60 parts of kieselguhr are thoroughly stirred. The molybdic oxide is then precipitated in a fine state of subdivision in the kieselguhr by adding a suitable amount of 10% sulfuric acid. 125 parts of a 33° Bé. potassium waterglass solution are added with vigorous agitation and the mixture warmed to 70-75° C. Complete precipitation is effected by adding about 100 parts of a 10% ammonium sulfate solution. The gel formed is sucked, washed with a small amount of water and then sprayed with 5% sulfuric or phosphoric acid in order to destroy the alkalinity of the zeolite, the spraying being continued until a sample when suspended in water gives an acid reaction to congo. The salt-like body produced is calcined at about 400° C.

A mixture of naphthalene vapors and air in proportion of 1:12 by weight is passed over the catalyst at 380-450° C. and excellent yields of phthalic anhydride are obtained.

Example 7.

A gel of a vanadium zeolite, as described in Example 3, prior to treatment with acid to form a salt-like body is kneaded with a gel of molybdenum zeolite as described in Example 6. The mixed zeolite obtained is then treated with gases containing 5-7% of sulfur dioxide and air at 450° C. until the alkalinity is neutralized. The catalyst is an excellent one for vapor phase oxidation of naphthalene to phthalic anhydride under conditions described in the foregoing examples.

Example 8.

A mixed zeolite as described in Example 7 is washed with a dilute potassium waterglass solution prepared by diluting a 33° Bé. solution with 4 volumes of water, and is then subjected to the sulfur dioxide treatment described above. The catalyst produced is excellent for the oxidation of naphthalene to alphanaphthaquinone and produces only a small amount of phthalic anhydride. This illustrates the effectiveness of certain salts of alkali-forming metals as stabilizers for oxidation catalysts, since, of course, the $SO_2$ gases and air reacting with the additional amounts of potassium waterglass produce additional amounts of potassium bisulfate.

Example 9.

14 parts of $V_2O_5$ are suspended in 200 parts of water and 5 parts of concentrated sulfuric acid are added. The vanadic oxide is then reduced in the usual manner at an elevated temperature with $SO_2$ to produce the vanadyl sulfate. The excess acid is then neutralized by a normal potassium hydroxide solution and 140 parts of 33° Bé. potassium waterglass solution diluted with 300 parts of water and then added to the blue vanadyl sulfate solution, the waterglass being permitted to flow in with vigorous agitation. A gel forms at once which is pressed, washed several times with small amounts of water, totaling 300 parts, and dried at temperatures below 300° C. After drying, the zeolite is ground with 60 parts of "Celite" earth and moistened with a solution of 20 parts of potassium bisulfate and 100 parts of water. The moistening is made uniform and the mass then formed to granules which are then dried and calcined at 400–450° C. in a stream of air to which, if desired, 3–6% of $SO_2$ may be added.

Naphthalene vapors mixed with air in the proportion of from 1:10 to 1:15 are passed over the catalyst at 380–440° C. Yields of phthalic anhydride amounting up to 85% of the theoretical may be obtained.

*Example 10.*

Natural or artificial zeolites in the form in which they are available commercially are digested with 5% aqueous solutions of potassium chloride, lithium chloride, rubidium chloride, cæsium chloride or mixtures in order to replace the sodium by base exchange. The zeolites are dried and 250 parts by volume are sprayed with a 2–3% ammonium vanadate or ammonium molybdate solution or a mixture of the two at an elevated temperature in order to impregnate the zeolites. The product is thereafter calcined at 400–450° C. in a stream of air and is then treated at the same temperature with a mixture of air and 5–7% of $SO_2$ containing gases, whereupon the contact sulfuric acid process begins. Air is then blown through until acid vapors are no longer noticeable.

Naphthalene vapors mixed with air in the proportion of from 1:10 to 1:20 by weight are passed over the catalyst at 370–420° C. and good yields of phthalic anhydride are obtained.

This application is a division of my prior co-pending application, Serial No. 150,623, filed November 24, 1926.

What is claimed as new is:

1. A method of oxidizing naphthalene, which comprises causing vapors of naphthalene admixed with an oxidizing gas to react in the presence of a catalyst containing a zeolite.

2. A method of oxidizing naphthalene, which comprises causing vapors of naphthalene admixed with an oxidizing gas to react in the presence of a catalyst containing a diluted zeolite.

3. A method of oxidizing naphthalene, which comprises causing vapors of naphthalene admixed with an oxidizing gas to react in the presence of a catalyst containing a diluted zeolite having catalytically active diluents.

4. A method of oxidizing naphthalene, which comprises causing naphthalene vapors admixed with an oxidizing gas to react in the presence of a catalyst containing a zeolite, at least part of the catalytically active elements being present in chemical combination with or in the zeolite.

5. A method of oxidizing naphthalene, which comprises passing naphthalene vapors admixed with an oxidizing gas over a catalyst containing a zeolite, at least part of the catalytically active elements being chemically combined in the zeolite in non-exchangeable form.

6. A method of oxidizing naphthalene, which comprises causing naphthalene vapors admixed with an oxidizing gas to react in the presence of a catalyst containing a zeolite which has been treated with substances containing acid radicals to form the so-called salt-like body.

7. A method of oxidizing naphthalene, which comprises causing naphthalene vapors admixed with an oxidizing gas to react in the presence of a catalyst containing a zeolite, at least one catalytically active component of the catalyst containing vanadium.

8. A method of oxidizing naphthalene, which comprises causing naphthalene vapors admixed with an oxidizing gas to react in the presence of a catalyst containing a zeolite having vanadium chemically combined in or with the zeolite.

9. A method of oxidizing naphthalene, which comprises causing naphthalene vapors admixed with an oxidizing gas to react in the presence of a catalyst containing vanadium chemically combined with a zeolite in non-exchangeable form.

10. A method according to claim 6 in which at least one of the acid radicals caused to react with the zeolite is catalytically active.

11. A method according to claim 6 in which a vanadium containing acid radical is caused to react with the zeolite to form the salt-like body.

12. A method according to claim 1 in which at least one catalytically active base is chemically combined in the zeolite in exchangeable form.

13. A method of oxidizing naphthalene to phthalic anhydride, which comprises passing naphthalene vapors and air over a catalyst containing a zeolite, the catalyst also containing components which favor the oxidation of naphthalene to phthalic anhydride.

14. A method of oxidizing naphthalene to phthalic anhydride, which comprises passing naphthalene vapors with an oxidizing gas over a catalyst which contains a zeolite, the alkalinity of which has been reduced.

15. A method of oxidizing naphthalene to phthalic anhydride, which comprises causing naphthalene vapors and an oxidizing gas to react in the presence of a catalyst containing a zeolite, at least one of the catalytically active components being chemically combined in or with the zeolite.

16. A method of oxidizing naphthalene to phthalic anhydride, which comprises causing naphthalene vapors and an oxidizing gas to pass over a catalyst favoring the oxidation of naphthalene to phthalic anhydride, which catalyst contains a diluted zeolite.

17. A method of oxidizing naphthalene to phthalic anhydride, which comprises causing naphthalene vapors and an oxidizing gas to pass over a zeolite catalyst containing vanadium and adjusted to favor the production of phthalic anhydride.

18. A method of oxidizing naphthalene to phthalic anhydride, which comprises causing naphthalene vapors and air to pass over a zeolite catalyst containing vanadium in chemical combination therein or therewith.

19. A method of oxidizing naphthalene to phthalic anhydride, which comprises causing naphthalene vapors and air to pass over a zeolite catalyst containing vanadium chemically combined in the zeolite in non-exchangeable form.

20. A method of oxidizing naphthalene to phthalic anhydride, which comprises causing naphthalene vapors and air to pass over a zeolite catalyst containing tetravalent vanadium chemically combined in the zeolite in non-exchangeable form.

Signed at Pittsburgh, Pa., this 9th day of December, 1927.

ALPHONS O. JAEGER.